US011781859B2

(12) United States Patent
Jung et al.

(10) Patent No.: US 11,781,859 B2
(45) Date of Patent: *Oct. 10, 2023

(54) ALIGNMENT INSPECTION APPARATUS FOR ELECTRODE ASSEMBLY AND ALIGNMENT INSPECTION METHOD FOR ELECTRODE ASSEMBLY USING THE SAME

(71) Applicant: LG ENERGY SOLUTION, LTD., Seoul (KR)

(72) Inventors: Tai Jin Jung, Daejeon (KR); Cha Hun Ku, Daejeon (KR); Su Taek Jung, Daejeon (KR); Jung Kwan Pyo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,418

(22) Filed: Mar. 22, 2022

(65) Prior Publication Data
US 2022/0214164 A1 Jul. 7, 2022

Related U.S. Application Data

(63) Continuation of application No. 16/636,244, filed as application No. PCT/KR2019/003406 on Mar. 22, 2019, now Pat. No. 11,307,026.

(30) Foreign Application Priority Data

Mar. 29, 2018 (KR) ........................ 10-2018-0036851

(51) Int. Cl.
*G01B 11/27* (2006.01)
*G01N 21/95* (2006.01)
(Continued)

(52) U.S. Cl.
CPC ........... *G01B 11/272* (2013.01); *G01N 21/95* (2013.01); *H04N 23/54* (2023.01); *H04N 23/56* (2023.01)

(58) Field of Classification Search
CPC .. G01B 11/272; G01N 21/95; G01N 21/8806; G01N 21/88; G01N 21/8851;
(Continued)

(56) References Cited

U.S. PATENT DOCUMENTS 8,325,350 B2   12/2012  Kim
8,369,482 B2    2/2013  Park et al.
(Continued)

FOREIGN PATENT DOCUMENTS

CN    101726261 A    6/2010
CN    105929460 A    9/2016
(Continued)

OTHER PUBLICATIONS

International Search Report (PCT/ISA/210) issued in PCT/KR2019/003406, dated Jul. 3, 2019.

*Primary Examiner* — Nasim N Nirjhar
(74) *Attorney, Agent, or Firm* — Birch, Stewart, Kolasch & Birch, LLP

(57) ABSTRACT

An alignment inspection apparatus for the electrode assembly including a laminate, in which a first separator, an internal electrode, a second separator, and an upper electrode are sequentially laminated, includes a camera disposed above a central portion of the electrode assembly to photograph and inspect the electrode assembly and side lights obliquely irradiating light onto each of both ends of the upper electrode. The side lights are symmetrical to each other with respect to the central portion of the electrode assembly.

5 Claims, 6 Drawing Sheets

(51) Int. Cl.
*H04N 23/54* (2023.01)
*H04N 23/56* (2023.01)

(58) Field of Classification Search
CPC .... H04N 5/2253; H04N 5/2256; Y02E 60/10; Y02P 70/50; H01M 10/0404; H01M 10/0413; H01M 10/0436
See application file for complete search history.

(56) References Cited

U.S. PATENT DOCUMENTS

| | | | |
|---|---|---|---|
| 10,346,969 B1 * | 7/2019 | Raghu | G06V 30/19173 |
| 2010/0091302 A1 * | 4/2010 | Kim | G01B 11/24 |
| | | | 356/603 |
| 2011/0096900 A1 | 4/2011 | Park et al. | |
| 2013/0250298 A1 * | 9/2013 | Komuta | G01B 11/272 |
| | | | 356/400 |
| 2014/0027643 A1 | 1/2014 | Aramaki et al. | |
| 2016/0149254 A1 * | 5/2016 | Ban | H01M 10/0413 |
| | | | 29/623.3 |

FOREIGN PATENT DOCUMENTS

| | | |
|---|---|---|
| JP | 2010-257861 A | 11/2010 |
| JP | 2013-161580 A | 8/2013 |
| JP | 5438368 B2 | 3/2014 |
| JP | 2015-176699 A | 10/2015 |
| JP | 5988474 B2 | 9/2016 |
| JP | 6237362 B2 | 11/2017 |
| KR | 2001-0029226 A | 4/2001 |
| KR | 10-2007-0122014 A | 12/2007 |
| KR | 10-2010-0041022 A | 4/2010 |
| KR | 10-2010-0107867 A | 10/2010 |
| KR | 10-2011-0046244 A | 5/2011 |
| KR | 10-1334121 B1 | 11/2013 |
| KR | 10-1730469 B1 | 4/2017 |
| KR | 10-2017-0057778 A | 5/2017 |
| KR | 10-2017-0102973 A | 9/2017 |

* cited by examiner

ALIGNMENT INSPECTION APPARATUS FOR ELECTRODE ASSEMBLY AND ALIGNMENT INSPECTION METHOD FOR ELECTRODE ASSEMBLY USING THE SAME

CROSS-REFERENCE TO RELATED APPLICATION

This application is a continuation of U.S. Ser. No. 16/636,244, filed Feb. 3, 2020, which is a national phase application of PCT/KR2019/003406, filed Mar. 22, 2019, and claims the priority of Korean Patent Application No. 10-2018-0036851, filed on Mar. 29, 2018, in the Korean Intellectual Property Office, the disclosure of which are incorporated herein by reference.

TECHNICAL FIELD

The present invention relates to an alignment inspection apparatus for an electrode assembly and an alignment inspection method, and more particularly, to an alignment inspection apparatus for an electrode assembly, which inspects alignment quality of an internal electrode laminated in the form of a sandwich between separators in a mono cell, and an align inspection method for an electrode assembly using the same.

BACKGROUND ART

Batteries (cells) that generate electric energy through physical or chemical reaction to supply the generated electric energy to the outside are used when AC power to be supplied to the building is not obtained, or DC power is required according to the living environments surrounded by various electric and electronic devices.

Among such batteries, primary batteries and secondary batteries, which are chemical batteries using chemical reaction, are being generally used. The primary batteries are consumable batteries which are collectively referred to as dry batteries. Also, secondary batteries are rechargeable batteries that are manufactured by using a material in a redox process between current and a substance is repeatable several times. When the reduction reaction is performed on the material by the current, power is charged, and when the oxidation reaction is performed on the material, power is discharged. Such the charging-discharging is repeatedly performed to generate electricity.

A lithium ion battery of the secondary batteries is manufactured through the following processes. An active material is applied to each of a positive electrode conductive foil and a negative electrode conductive foil at a predetermined thickness, and a separator is disposed between the positive electrode conductive foil and the negative electrode conductive foil, and then, an electrode assembly, in which the positive electrode conductive foil, the separator, and the negative electrode conductive foil are wound several times in a jelly-roll or cylindrical shape, is accommodated into a cylindrical or prismatic can, a pouch, and the like to seal the resultant product, thereby manufacturing the lithium ion battery.

An electrode assembly according to the related art is disclosed in Korean Patent Publication No. 10-2017-0057778.

There is a method, in which mono cells are produced to be laminated so as to manufacture a finished cell, as one method for manufacturing an electrode assembly according to the related art.

In the mono cell, the two outermost electrodes have polarities different from each other. When the plurality of electrodes are laminated with a separator therebetween, there is a problem in that it is difficult to inspect alignment quality of the internal electrode disposed at an intermediate layer because the separator is laminated on each of top and bottom surfaces of the internal electrode.

DISCLOSURE OF THE INVENTION

Technical Problem

Therefore, the present invention has been made to solve the abovementioned problem, and an object of the prevent invention is to provide an alignment inspection apparatus for an electrode assembly, which inspects alignment quality of a mono cell, and an alignment inspection method for an electrode assembly using the same.

Technical Solution

An alignment inspection apparatus for an electrode assembly including a laminate, in which a separator, an internal electrode, a separator, and an upper electrode are sequentially laminated, according to an embodiment of the present invention includes a camera unit disposed above a central portion of the electrode assembly to photograph and inspect the electrode assembly and a side lighting unit obliquely irradiating light onto each of both ends of the upper electrode, which are symmetrical to each other with respect to the central portion of the electrode assembly.

The alignment inspection apparatus may further include a low lighting unit disposed below the electrode assembly to irradiate light onto a bottom surface of the electrode assembly.

The alignment inspection apparatus may further include a control unit measuring an aligned (alignment) state of the electrode assembly through photographed information of the electrode assembly observed through the camera unit.

The control unit may measure a distance between one end of an internal electrode tab and one end of the upper electrode of the electrode assembly.

An alignment inspection method for an electrode assembly through the alignment inspection apparatus of claim 1 according to an embodiment of the present invention includes an upper light irradiation step of obliquely irradiating light onto each of both ends of the electrode assembly, which are symmetrical to each other with respect to a central portion of the electrode assembly, by using a side lighting unit and a photographing step of photographing the electrode assembly through a camera unit disposed above the central portion of the electrode assembly.

The alignment inspection method may further include a measurement step of transmitting information observed through the camera unit to the control unit to allow the control unit to measure a distance between one end of an internal electrode tab and one end of an upper electrode.

An alignment inspection method for an electrode assembly through the alignment inspection apparatus of claim 1 according to another embodiment of the present invention includes an upper light irradiation step of obliquely irradiating light onto each of both ends of the electrode assembly, which are symmetrical to each other with respect to a central portion of the electrode assembly, by using a side lighting unit, a lower light irradiation step of irradiating light onto a bottom surface of the electrode assembly by using a lower lighting unit, and a photographing step of photographing the electrode assembly through a camera unit disposed above the central portion of the electrode assembly.

The alignment inspection method may further include a measurement step of transmitting information observed through the camera unit to the control unit to allow the control unit to measure a distance between one end of an internal electrode, which is projected to a separator by the lower lighting unit, and one end of upper electrode.

Advantageous Effects

According to the present invention, the alignment inspection of the internal electrode of the mono cell may be enabled by using the distance between the internal electrode tab and the upper electrode.

According to the present invention, the lighting is illuminated onto each of both ends and the bottom surface of the mono cell to measure the distance between the ends of the internal electrode and the upper electrode, thereby performing the alignment inspection of the internal electrode.

MODE FOR CARRYING OUT THE INVENTION

Figure 1:
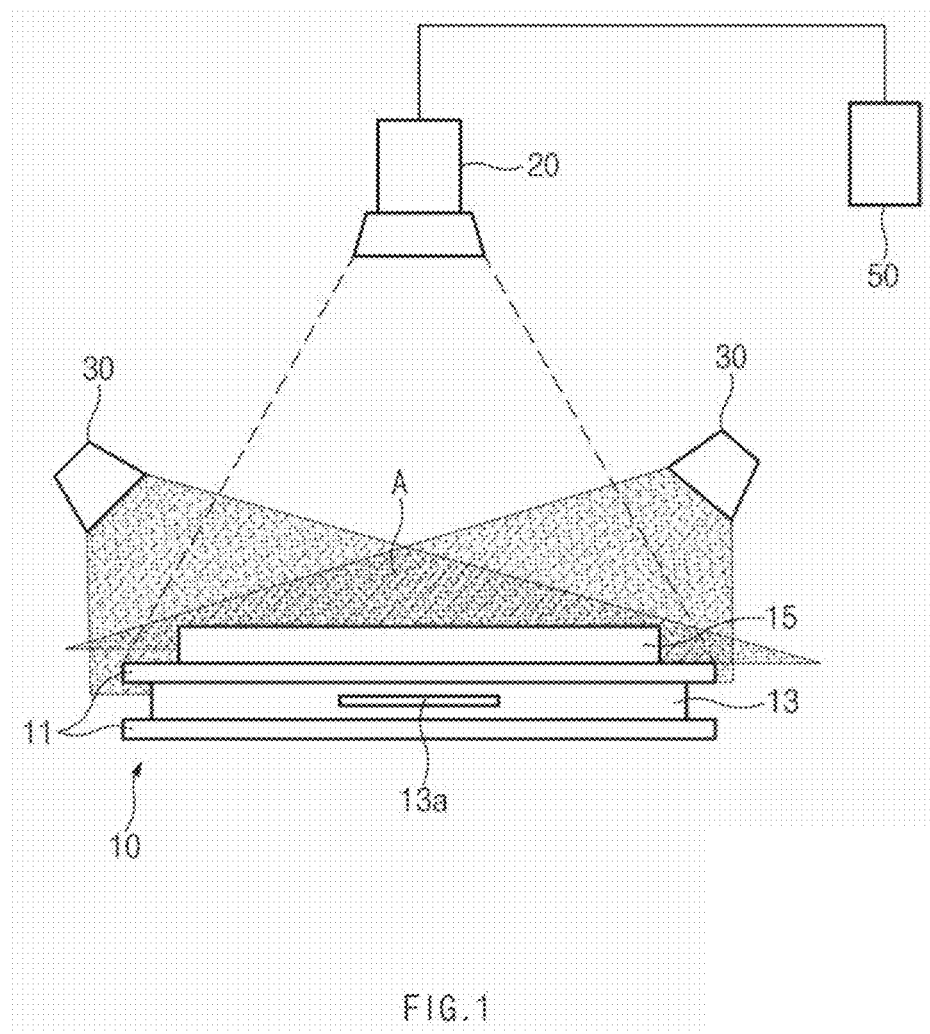
FIG. 1 is a side view illustrating an inspection apparatus for an electrode assembly according to an embodiment of the present invention.

Hereinafter, an alignment inspection apparatus for an electrode assembly according to a preferred embodiment of the present invention will be described in detail with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

Figure 2:
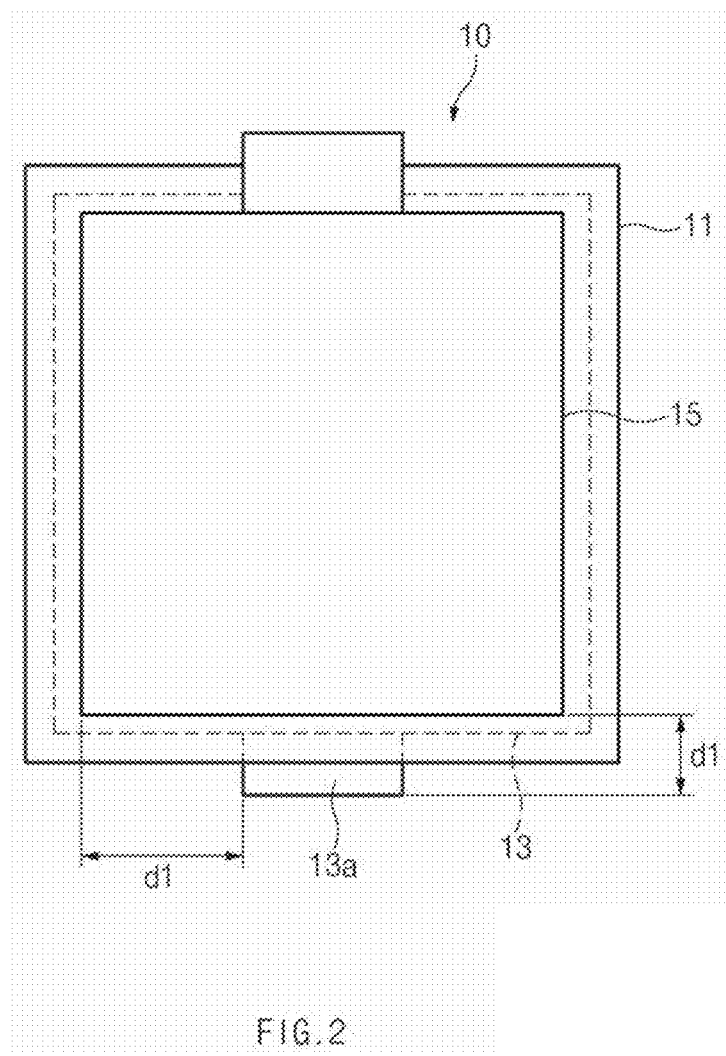
FIG. 2 is a plan view of only the electrode assembly of FIG. 1.

FIG. 1 is a side view illustrating an inspection apparatus for an electrode assembly according to an embodiment of the present invention, and FIG. 2 is a plan view of only the electrode assembly of FIG. 1.

As illustrated in FIGS. 1 to 2, an inspection apparatus for an electrode assembly according to an embodiment of the present invention relates to an alignment inspection apparatus for an electrode assembly 10 including a laminate in which a separator 11, an internal electrode 13, a separator 11, and an upper electrode 15 are sequentially laminated. The inspection apparatus for the electrode assembly according to an embodiment of the present invention includes a camera unit disposed above a central portion of the electrode assembly 10 to photograph and inspect the electrode assembly 10 and a side lighting unit 30 that obliquely irradiates light onto both ends of the upper electrode 15, which are symmetrical to each other with respect to a central portion of the electrode assembly 10.

The electrode assembly 10 may be a mono cell. The internal electrode 13 may be a positive electrode, and the upper electrode 15 may be a positive electrode having an opposite polarity to the internal electrode 13. When the internal electrode 13 is the positive electrode, the upper electrode 15 may be the negative electrode having an opposite polarity to the internal electrode.

The internal electrode 13 may be disposed between the separators 11 in the form of a sandwich in which the separators are laminated on top and bottom surfaces of the internal electrode 13. Also, since each of the separators 11 has a size greater than that of the internal electrode 13, the internal electrode 13 may be completely covered by the separators disposed on the top and bottom surfaces of the internal electrode 13 when viewed in the plan view of FIG. 2.

The upper electrode 15 may have a size less than that of the internal electrode 13.

An electrode tab extending from each of opposite ends of the internal electrode 13 and the upper electrode 15 may be formed on each of the ends.

The camera unit 20 may be installed above a central portion of the electrode assembly 10 so as to be spaced a predetermined distance from the electrode assembly 10 to photograph the electrode assembly 10 from an upper side of the central portion of the electrode assembly 10.

The side lighting unit 30 is installed above each of both ends of the electrode assembly 10 so as to be spaced upward from th electrode assembly 10. A spaced distance between the side lighting unit 30 and the electrode assembly 10 may be less than that between the camera unit 20 and the electrode assembly 10. The reason in which the camera unit 20 is installed to have a longer distance from the electrode assembly 10 than the side lighting unit 30 may be for photographing the entire shape of the electrode assembly 10.

The side lighting unit 30 may be provided in a pair on the ends of the electrode assembly, on which the electrode tab is not formed, of the ends of the electrode assembly 10 so that the pair of side lighting units 30 are symmetrical to each other with respect to the central portion of the electrode assembly 10. Thus, the side lighting units 30 may obliquely irradiate light toward both the ends of the upper electrode 15 at a predetermined angle.

The side lighting units 30 may be spaced a predetermined distance from the electrode assembly 10 so as to be symmetrical to each other with respect to the central portion of the electrode assembly 10, thereby obliquely irradiating light onto both the ends of the upper electrode 15. Thus, the light may be irradiated onto an area A of the electrode assembly 10, on which the light irradiated from the pair of side lighting unit 30 overlap each other. As a result, the shaded portion by the irradiation may be removed on the electrode assembly 10 photographed by the camera that disposed above the central portion to photograph the electrode assembly to maximize brightness of the lighting that irradiates the electrode assembly 10.

The camera unit 20 may photograph the electrode assembly 10 to transmit photographed image information to a control unit 50.

For example, the control unit 50 may be a central processing unit (CPU). The control unit 50 may measure a length d1 between one end of an internal electrode tab 13a of the internal electrode 13 and one end of the upper electrode 15 of the electrode assembly 10 from the image information transmitted from the camera unit 20. An alignment state between the upper electrode 15 and the internal electrode 13 may be inspected through the measured value.

Since the internal electrode tab 13a is a component that is attached to the internal electrode 13, when the internal electrode moves, the internal electrode tab 13a may also move. Thus, a position of the internal electrode 13 may be grasped through a position of the internal electrode tab 13a.

Figure 3:
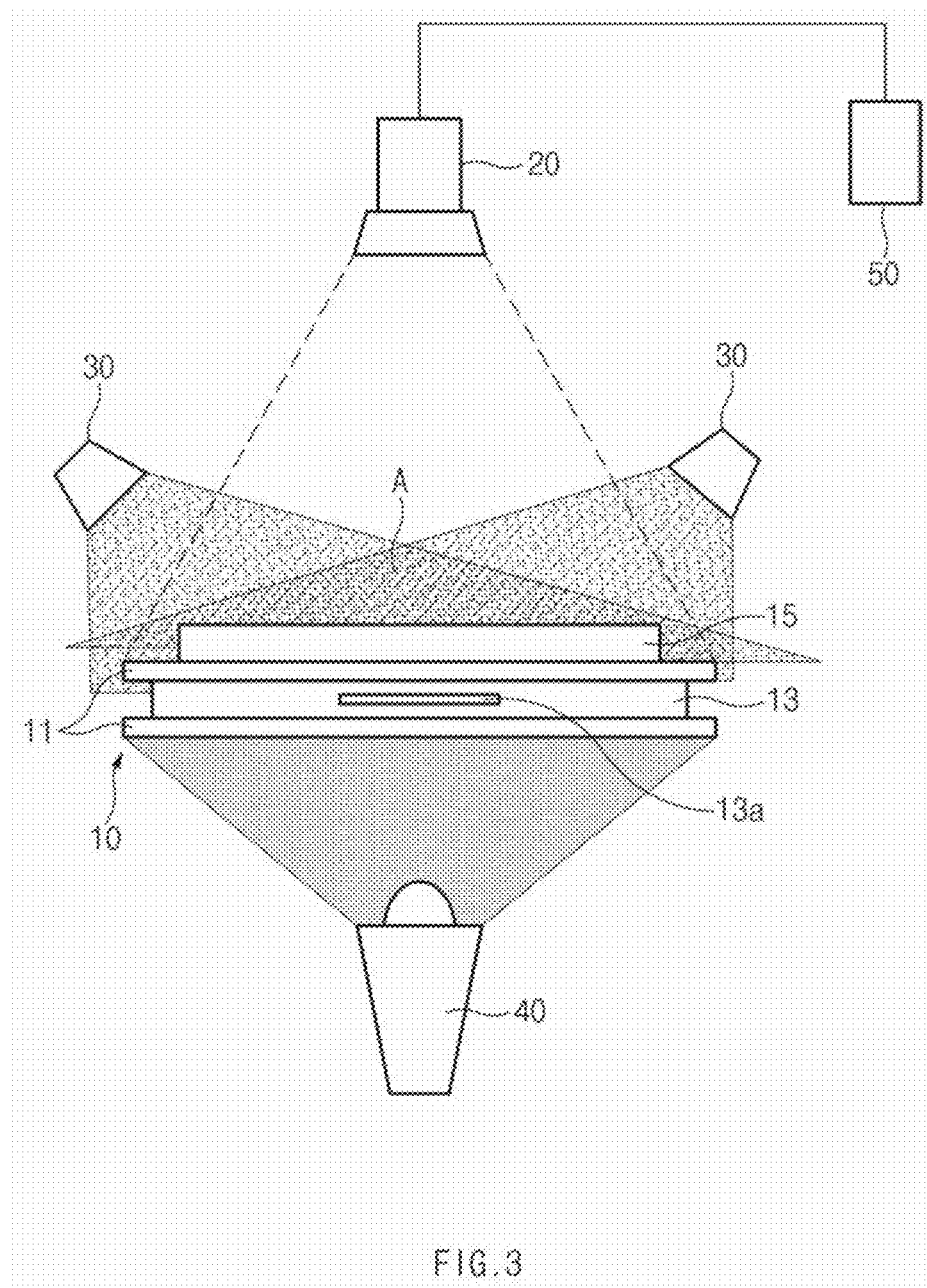
FIG. 3 is a side view of an inspection apparatus for an electrode assembly according to another embodiment of the present invention.
Figure 4:
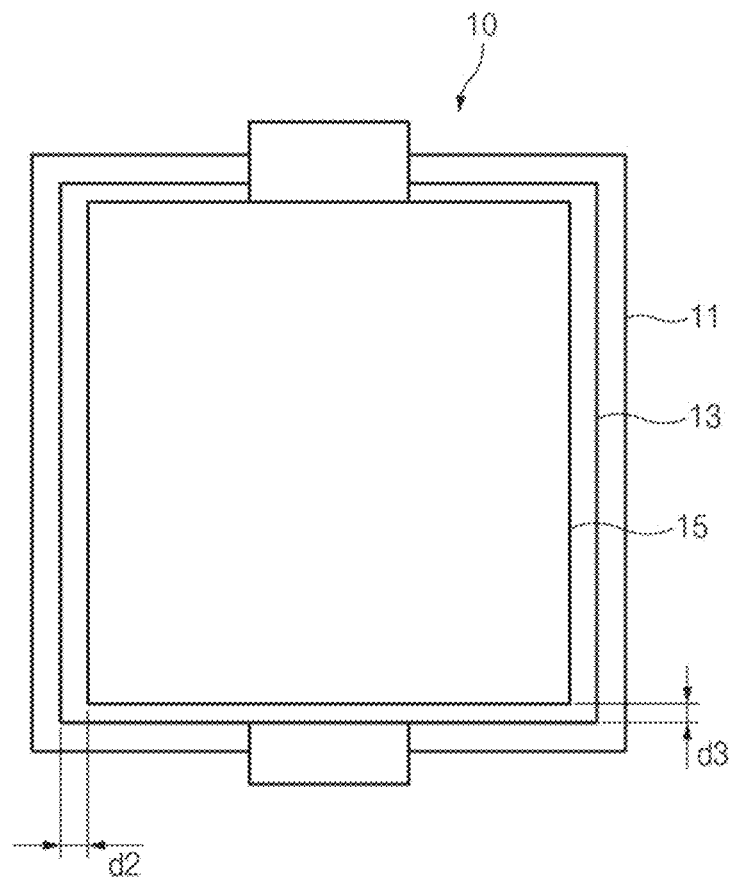
FIG. 4 is a plan view of only the electrode assembly of FIG. 3.

FIG. 3 is a side view illustrating an inspection apparatus for an electrode assembly according to another embodiment of the present invention, and FIG. 4 is a plan view of only the electrode assembly of FIG. 3.

Referring to FIGS. 3 and 4, an inspection apparatus for an electrode assembly according to another embodiment of the present invention may include a low lighting unit 40 that is installed below the electrode assembly 10 to irradiate light to a bottom surface of the electrode assembly 10.

The low lighting unit 40 may irradiate light to a separator 11 that forms the bottom surface of the electrode assembly 10 to project the internal electrode 13 laminated in the form of a sandwich between the two separators 11 to the separator 11. A boundary line of the internal electrode, which is hidden by the separator, may be seen on an upper surface of the separator due to the lower lighting unit 40.

Here, the camera unit 20 may photograph the electrode assembly 10 from an upper side of a central portion of the electrode assembly 10 to transmit photographed image information to the control unit 50, and the control unit 50 may measure a distance d2 between one end of the internal electrode 13 and one end of the upper electrode 15 on the basis of the transmitted image information. The distance d2 may be a distance that is measured in a width direction. Also, a distance d3 may be measured in a length direction.

An alignment state between the upper electrode 15 and the internal electrode 13 may be inspected through the measured value. When the distances are measured through the above-described manner, the distances may be more precisely measured when compared to the measurement through the internal electrode tab 13a according to an embodiment.

Hereinafter, an inspection method for an electrode assembly will be described in detail with reference to the accompanying drawings.

Figure 5:
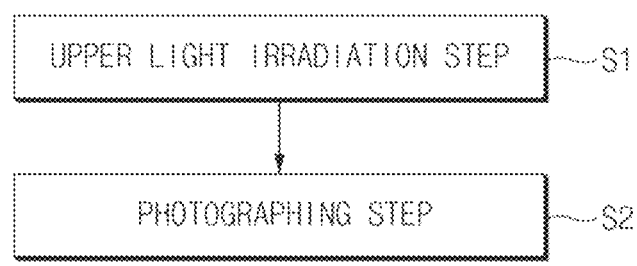
FIG. 5 is a flowchart sequentially illustrating an inspection method for an electrode assembly according to an embodiment of the prevent invention.

FIG. 5 is a flowchart sequentially illustrating an inspection method for an electrode assembly according to an embodiment of the prevent invention.

As illustrated in FIG. 5, an inspection method for an electrode assembly according to an embodiment of the present invention includes an upper light irradiation step (S1) and a photographing step (S2).

The upper light irradiation step (S1) may be a step of irradiating light by using a side lighting unit 30 installed to be spaced upward from the electrode assembly 10. Particularly, the upper light irradiation step (S1) may be a step of installing the side lighting unit 30 on each of both ends, which are symmetrical to each other with respect to a central portion of the electrode assembly 10, to obliquely irradiate light to both ends of the upper electrode 15.

The photographing step (S2) may be a step of photographing the electrode assembly 10 through a camera unit 20 disposed above the central portion of the electrode assembly 10 when light of the side lighting unit 30 is irradiated onto the electrode assembly 10 in the upper light irradiation step (S1).

The inspection method may further include a measurement step of transmitting information of an image photographed by the camera unit 20 to a control unit 50 in the photographing step (S2) to allow the control unit 50 to measure a distance d1 between one end of an internal electrode tab 13a and one end of an upper electrode 15 from the image information transmitted from the camera unit 20.

Figure 6:
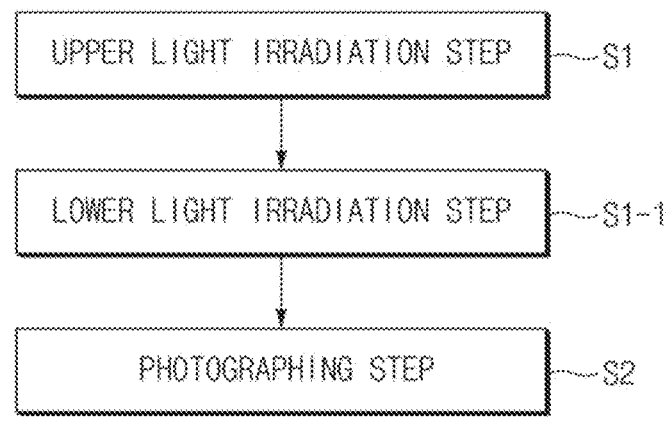
FIG. 6 is a flowchart sequentially illustrating an inspection method for an electrode assembly according to another embodiment of the prevent invention.

FIG. 6 is a flowchart sequentially illustrating an inspection method for an electrode assembly according to another embodiment of the prevent invention.

As illustrated in FIG. 6, an inspect method for an electrode assembly according to another embodiment of the present invention may include an upper light irradiation step (S1), a lower light irradiation step (S1-1), and a photographing step (S2).

The upper light irradiation step (S1) may be a step of irradiating light by using a side lighting unit 30 installed to be spaced upward from the electrode assembly 10. Particularly, the upper light irradiation step (S1) may be a step of installing the side lighting unit 30 on each of both ends, which are symmetrical to each other with respect to a central portion of the electrode assembly 10, to obliquely irradiate light to both ends of the upper electrode 15.

The lower light irradiation step (S1-1) may be a step of irradiating light onto a bottom surface of the electrode assembly by using the lower lighting unit 40 installed below the central portion of the electrode assembly 10.

The photographing step (S2) may be a step of photographing the electrode assembly 10 by using a camera unit 20 disposed above the central portion of the electrode assembly 10 when light of the side lighting unit 30 is irradiated onto the electrode assembly 10 in the upper light irradiation step (S1), and light of the lower lighting unit 40 is irradiated onto a bottom surface of the electrode assembly 10 in the lower light irradiation step (S1-1) so that an internal electrode 13 is projected to a separator 11.

The inspection method may further include a measurement step of transmitting information of an image photographed by the camera unit 20 to a control unit 50 in the photographing step (S2) to allow the control unit 50 to measure a distance d2 between one end of the internal electrode 13, which is projected to the separator 11, and one end of the upper electrode 15 from the image information transmitted from the camera unit 20.

As described above, according to an embodiment of the present invention, the alignment inspection of the internal electrode of the mono cell may be enabled by using the distance between the internal electrode tab and the upper electrode.

Also, according to another embodiment of the present invention, the lighting is illuminated onto each of upper sides of both ends and the bottom surface of the mono cell to measure the distance between the ends of the internal electrode and the upper electrode, thereby performing the alignment inspection of the internal electrode.

Although the alignment inspection apparatus for the electrode assembly and the alignment inspection method for the electrode assembly using the same according to the present invention have been described above with reference to the exemplary drawings, various changes and modifications may be made thereto by one skilled in the art without departing from the scope and spirit of the invention as set forth in the appended claims.

The invention claimed is:

1. An alignment inspection apparatus for an electrode assembly comprising:
   a laminate in which a first separator, an internal electrode, a second separator, and an upper electrode are sequentially stacked in a first direction, the upper electrode forming a top surface of the electrode assembly,
   a camera disposed in the first direction above a central portion of the electrode assembly to photograph and inspect the electrode assembly;
   side lights at an oblique angle to an upper surface of the electrode assembly, the side lights irradiating light onto each of both ends of the upper electrode, which are symmetrical to each other with respect to the central portion of the electrode assembly;
   a controller measuring an alignment state of the electrode assembly through photographed information of the electrode assembly observed through the camera; and
   an internal electrode tab extending from the internal electrode in a second direction, the second direction being perpendicular to the first direction,
   wherein the controller measures a distance in a third direction between a side edge end of the internal electrode tab and a side edge of the upper electrode of the electrode assembly,
   wherein the side lights obliquely irradiate light onto each of both ends of the electrode assembly, which are symmetrical to each other with respect to a central portion of the electrode assembly and irradiate light onto a bottom surface of the electrode assembly by using a lower light,
   wherein the camera transmits information observed through the camera to the controller, and
   wherein the controller measures a distance between one end of an internal electrode, which is projected to the second separator by the lower light, and one end of upper electrode.

2. The alignment inspection apparatus of claim 1, further comprising a low light disposed below the electrode assembly to irradiate light onto a bottom surface of the electrode assembly.

3. The alignment inspection apparatus of claim 1, further comprising a controller measuring an alignment state of the electrode assembly through photographed information of the electrode assembly observed through the camera.

4. The alignment inspection apparatus of claim 3, wherein the controller measures a distance between one end of an internal electrode tab and one end of the upper electrode of the electrode assembly.

5. The alignment inspection apparatus of claim 1, wherein the controller measures a distance in the first direction between one end of the internal electrode tab and one end of the upper electrode of the electrode assembly.

* * * * *